(12) United States Patent
Liu

(10) Patent No.: US 12,124,543 B2
(45) Date of Patent: Oct. 22, 2024

(54) PERMISSION CONFIGURATION METHOD AND TERMINAL DEVICE

(71) Applicant: VIVO MOBILE COMMUNICATION CO., LTD., Guangdong (CN)

(72) Inventor: Shaoling Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 369 days.

(21) Appl. No.: 17/487,974

(22) Filed: Sep. 28, 2021

(65) Prior Publication Data

US 2022/0019645 A1 Jan. 20, 2022

Related U.S. Application Data

(63) Continuation of application No. PCT/CN2020/078653, filed on Mar. 10, 2020.

(30) Foreign Application Priority Data

Mar. 28, 2019 (CN) .......................... 201910245164.3

(51) Int. Cl.
*G06F 21/12* (2013.01)
(52) U.S. Cl.
CPC .................................. *G06F 21/121* (2013.01)
(58) Field of Classification Search
CPC ...................................................... G06F 21/121
See application file for complete search history.

(56) References Cited

U.S. PATENT DOCUMENTS

| 9,300,645 | B1* | 3/2016 | Rao ......................... H04L 63/08 |
| 2012/0284673 | A1* | 11/2012 | Lamb .................. G06F 3/04883 715/863 |
| 2015/0281869 | A1* | 10/2015 | Ramachandran ....... H04W 4/50 455/418 |

(Continued)

FOREIGN PATENT DOCUMENTS

| CN | 101034990 A | 9/2007 |
| CN | 101753963 A | 6/2010 |

(Continued)

OTHER PUBLICATIONS

International Search Report of International Application No. PCT/CN2020/078653 mailed on May 14, 2020.

(Continued)

*Primary Examiner* — Azizul Choudhury
(74) *Attorney, Agent, or Firm* — IP & T GROUP LLP

(57) ABSTRACT

A permission configuration method includes: receiving a first input performed by a user on a first object and a second object, where the first object is an object that indicates a first application on a first interface, and the second object is an object that indicates a second application or a tartlet function on a second interface; and displaying, on the first interface in response to the first input, a target permission set used to configure a permission for the first application, where the target permission set is an intersection set between a first permission set and a second permission set, the first permission set is a permission set of the first application, and the second permission set is a permission set of the second application or the target function; and the first interface is different from the second interface.

15 Claims, 10 Drawing Sheets

(56) References Cited

U.S. PATENT DOCUMENTS

| | | | |
|---|---|---|---|
| 2016/0210467 A1* | 7/2016 | Mehrab | G06F 21/6245 |
| 2016/0292433 A1 | 10/2016 | Yu | |
| 2016/0350522 A1* | 12/2016 | Chi | G06F 3/04845 |
| 2018/0293059 A1* | 10/2018 | Armand | G06F 8/61 |

FOREIGN PATENT DOCUMENTS

| | | |
|---|---|---|
| CN | 101902402 A | 12/2010 |
| CN | 103809840 A | 5/2014 |
| CN | 105631311 A | 6/2016 |
| CN | 106570358 A | 4/2017 |
| CN | 107180186 A | 9/2017 |
| CN | 109343900 A | 2/2019 |
| CN | 110084004 A | 8/2019 |
| EP | 2533168 A1 | 12/2012 |
| EP | 3295363 | 3/2018 |
| WO | 2016/036027 A1 | 3/2016 |
| WO | 2016/182272 A1 | 11/2016 |

OTHER PUBLICATIONS

Written Opinion of The International Searching Authority of International Application No. PCT/CN2020/078653 mailed on May 14, 2020.
First Office Action of Priority Application No. CN 201910245164.3 mailed on Jul. 24, 2020.
Notification to Grant Patent Right for Invention of Priority Application No. CN 201910245164.3 mailed on May 8, 2021.
Extended European Search Report for European Patent Application No. 20780028.5 issued by the European Patent Office on Apr. 8, 2022.

* cited by examiner

PERMISSION CONFIGURATION METHOD AND TERMINAL DEVICE

CROSS-REFERENCE TO RELATED APPLICATIONS

This application is a Bypass Continuation Application of PCT/CN2020/078653, filed on Mar. 10, 2020, which claims priority to Chinese Patent Application No. 201910245164.3, filed on Mar. 28, 2019, which are incorporated herein by reference in their entirety.

TECHNICAL FIELD

Embodiments of the present disclosure relate to the field of communications technologies, and in particular, to a permission configuration method and a terminal device.

BACKGROUND

With continuous development of terminal technologies and Internet technologies, people may use more and more application programs (hereinafter referred to as applications) through a terminal device (such as a mobile phone).

SUMMARY

Embodiments of the present disclosure provide a permission configuration method and a terminal.

According to a first aspect, an embodiment of the present disclosure provides a permission configuration method. The method may be applied to a terminal device. The method may include: receiving a first input performed by a user, and displaying a target permission set on a first interface in response to the first input. The first input is an input performed on a first object and a second object, the first object is used to indicate a first application, the second object is used to indicate a target object, the target object is a second application or a target function, the first object is an object on the first interface, and the second object is an object on a second interface; the target permission se is an intersection se between a first permission se and a second permission set, the first permission set is a permission set of the first application, the second permission set is a permission set of the target object, and the target permission set is used to configure a permission of the first application; and the first interface is different from the second interface.

According to a second aspect, an embodiment of the present disclosure provides a terminal device. The terminal device includes a receiving module and a display module. The receiving module is configured to receive a first input performed by a user, where the first input is an input performed on a first object and a second object, the first object is used to indicate a first application, the second object is used to indicate a target object, the target object is a second application or a target function, the first object is an object on a first interface, and the second object is an object on a second interface. The display module is configured to display a target permission set on the first interface in response to the first input received by the receiving module, where the target permission set is an intersection set between a first permission set and a second permission set, the first permission set is a permission set of the first application, the second permission set is a permission set of the target object, and the target permission set is used to configure a permission of the first application; and the first interface is different from the second interface.

According to a third aspect, an embodiment of the present disclosure provides a terminal device. The terminal device includes a processor, a memory, and a computer program that is stored in the memory and executable on the processor, and when the computer program is executed by the processor, the steps of the permission configuration method in the first aspect are implemented.

According to a fourth aspect, an embodiment of the present disclosure provides a non-transitory computer-readable storage medium. The non-transitory computer-readable storage medium stores a computer program, and when the computer program is executed by a processor, the steps of the permission configuration method in the first aspect are implemented.

DESCRIPTION OF EMBODIMENTS

Figure 1:
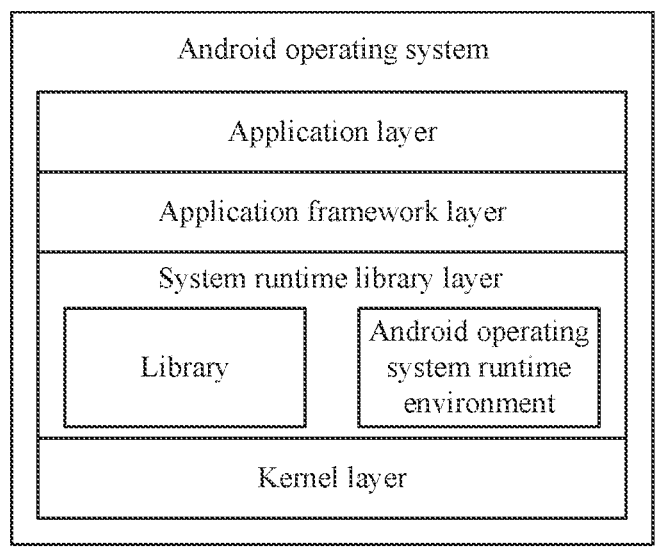
FIG. 1 is a schematic architectural diagram of an Android operating system according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

The term "and/or" in this specification describes an association relationship of associated objects, indicating that three relationships may exist. For example, A and/or B may indicate three cases: Only A exists, both A and B exist, and only B exists. A character "/" in this specification indicates an "or" relationship between associated objects. For example, A/B indicates A or B.

In the specification and claims of the present disclosure, the terms such as "first" and "second" are used to distinguish between different objects, but are not used to describe a particular sequence of the objects. For example, a first input and a second input are intended to distinguish between different inputs, instead of describing a particular order of the inputs.

In the embodiments of the present disclosure, the word such as "example" or "for example" is used to represent giving an example, an illustration, or a description. Any embodiment or design scheme described as "example" or "for example" in the embodiments of the present disclosure should not be construed as being more preferred or advantageous than other embodiments or design schemes. To be precise, the use of the term such as "example" or "for example" is intended to present a related concept in a specific manner.

In the descriptions of the embodiments of the present disclosure, unless otherwise stated, "a plurality of" means two or more, for example, a plurality of permissions means two or more permissions.

In the embodiments of the present disclosure, one permission set may include a plurality of permission entries. In addition, one permission set (for example, a first permission set) may correspond to a plurality of permissions. Each permission in the plurality of permissions may be represented by one permission entry in the permission set. One permission entry may include one permission name and one permission state. The permission name may be used to indicate a permission, and the permission state may be used to indicate a state of the permission.

The embodiments of the present disclosure provide a permission configuration method and a terminal device. The terminal device may receive a first input performed by a user (the first input is an input performed on a first object used to indicate a first application and a second object used to indicate a second application), and display a target permission set on a first interface of the terminal device in response to the first input, where the target permission set is used to configure a permission of the first application, and the target permission set is an intersection set between a permission set of the first application and a permission set of the second application. In this solution, when the user needs to configure, for one application (for example, the foregoing first application), a permission to access another application (for example, the foregoing second application), the user may trigger, through an input performed on objects that indicate the two applications, the terminal device to automatically obtain an intersection set (for example, the foregoing target permission set) of permission sets of the two applications, and display the intersection set to the user, so that the user can configure, for the first application through input on a permission entry in the intersection set, the permission to access the second application. In this way, when the user needs to configure, for one application, a permission to access another application, the user may trigger, through one input, the terminal device to quickly display a permission entry that may be configured for the application, without requiring, as in the prior art, the user to spend a large amount of time searching for a permission entry that needs to be configured on the permission management interface. Therefore, in the permission configuration method provided in the embodiments of the present disclosure, an invalid search of the user on the permission management interface can be avoided, so that duration in which the terminal device configures a permission for an application can be shortened, thereby improving efficiency of configuring the permission for the application by the terminal device.

The terminal device in the embodiments of the present disclosure may be a terminal device with an operating system. The operating system may be an Android operating system, an iOS operating system, or another possible operating system. This is not specifically limited in the embodiments of the present disclosure.

The following uses the Android operating system as an example to describe a software environment to which the permission configuration method provided in the embodiments of the present invention is applied.

As shown in FIG. 1, FIG. 1 is a schematic architectural diagram of a possible Android operating system according to an embodiment of the present disclosure. In FIG. 1, an architecture of the Android operating system includes four layers: an application layer, an application program framework layer, a system runtime library layer, and a kernel layer (which may be a Linux kernel layer).

The application layer includes various applications in the Android operating system (including system applications and third-party applications).

The application program framework layer is an application program framework, and the developer may develop some application programs based on the application program framework layer when following a development rule of the application program framework.

The system runtime library layer includes a library (also referred to as a system library) and an Android operating system runtime environment. The library mainly provides various resources required for the Android operating system. The running environment of the Android operating system is used for providing a software environment for the Android operating system.

The kernel layer is an operating system layer of the Android operating system, and is a lowest layer of software levels of the Android operating system. The kernel layer provides core system services and hardware-related drivers for the Android operating system based on the Linux kernel.

The Android operating system is used as an example. In the embodiments of the present invention, a developer may develop, based on the system architecture of the Android operating system shown in FIG. 1, a software program to implement the permission configuration method provided in the embodiments of the present invention, so that the permission configuration method can run based on the Android operating system shown in FIG. 1. That is, a processor or a terminal may run the software program in the Android operating system to implement the permission configuration method provided in this embodiment of the present disclosure.

The terminal device in the embodiments of the present disclosure may be a mobile terminal, or may be a non-mobile terminal. For example, the mobile terminal may be a mobile phone, a tablet computer, a laptop computer, a palmtop computer, an in-vehicle terminal, a wearable device, an ultra-mobile personal computer (UMPC), a netbook, or a personal digital assistant (PDA). The non-mobile terminal may be a personal computer (PC), a television (TV), an automated teller machine or a self-service machine. This is not specifically limited in the embodiments of the present disclosure.

The permission configuration method provided in the embodiments of the present disclosure may be performed by the foregoing terminal device, or a functional module and/or a functional entity that can implement the permission configuration method in the terminal device. Specifically, this may be determined based on an actual use requirement, and is not limited in the embodiments of the present disclosure. Taking the terminal device as an example, the following describes the permission configuration method provided in the embodiments of the present disclosure.

Currently, to protect security of privacy information of a user, in a process of using an application by the user, various permission application prompt boxes may pop up on a terminal device. For these permission application prompt boxes, the user may trigger, by selecting "Allow", "Always Allow", "Forbid", "No query after the prohibition", to trigger the terminal device to allow or forbid an application to have a corresponding permission. After the user triggers, by selecting "No query after the prohibition", the terminal device to forbid the application to have a permission, if the user needs to trigger the terminal device to allow the application to have the permission, the user may search for, on a permission management interface, a permission entry used to indicate the permission, and then cancel the prohibition.

However, because there are generally a relatively large quantity of permission entries on the permission management interface, a process of searching for a permission entry by the user may be relatively time-consuming, and consequently, a process of configuring the permission for the application by the terminal device may be relatively time-consuming.

In the embodiments of the present disclosure, when a user uses an application (hereinafter referred to as an application A, for example, may be the first application in the embodiments of the present disclosure), the user may need to use a function of the application. When the function can be implemented only by accessing another application (hereinafter referred to as an application B, for example, may be the second application in the embodiments of the present disclosure), the user needs to configure a permission for the application A to access the application B. In the embodiments of the present disclosure, in this scenario, the user may directly trigger, through one input (for example, the first input in the embodiments of the present disclosure), the terminal device to display a permission entry (which may be one permission entry or a plurality of permission entries, and when the permission entry is a plurality of permission entries, the plurality of permission entries may be displayed in a form of a permission set) of a permission that is configured for the application A to access the application B.

In the embodiments of the present disclosure, the foregoing permission configured for the application A to access the application B may be a permission configured for the application A to access all functions of the application B, or may be a permission configured for the application A to access some functions of the application B. Specifically, this may be determined based on an actual use requirement, and is not limited in the embodiments of the present disclosure.

Optionally, in the embodiments of the present disclosure, after the permission to access the application B is configured for the application A, the application A may invoke the application B. For example, after the permission to access all functions of the application B is configured for the application A, the application A may invoke all functions of the application B. After the permission to access some functions of the application B is configured for the application A, the application A may invoke some functions of the application B (that is, these functions of the permission are configured).

The following describes the permission configuration method provided in the embodiments of the present disclosure by using an example with reference to the accompanying drawings.

Figure 2:
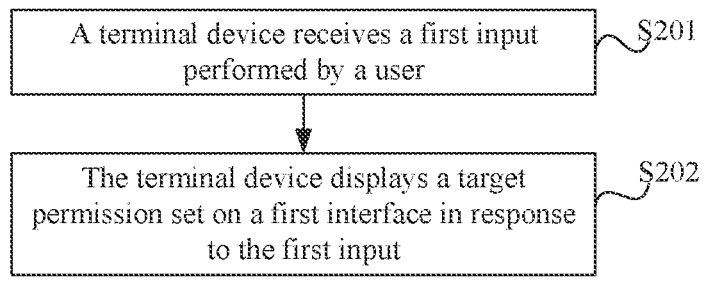
FIG. 2 is a schematic diagram 1 of a permission configuration method according to an embodiment of the present disclosure.

As shown in FIG. 2, an embodiment of the present disclosure provides a permission configuration method. The method may include the following S201 and S202.

S201. A terminal device receives a first input performed by a user.

The first input may be an input performed by the user on a first object and a second object. The first object may be used to indicate a first application, the second object may be used to indicate a target object, the target object may be a second application or a target function, the first object may be an object on a first interface, and the second object may be an object on a second interface.

Figure 3:
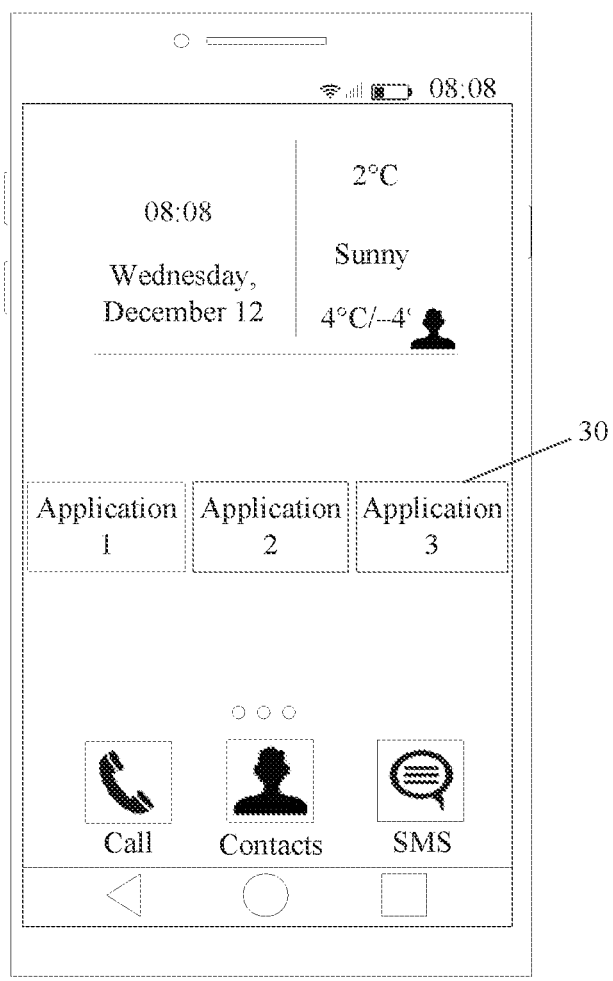
FIG. 3 is a schematic diagram of displaying a first object by a terminal device according to an embodiment of the present disclosure.

Optionally, in this embodiment of the present disclosure, the first object may be an application icon of the first application (as shown in 30 in FIG. 3), or may be any object that may be used to indicate the first application such as any area on an application interface of the first application. Specifically, this may be determined based on an actual use requirement, and is not limited in this embodiment of the present disclosure.

Optionally, in this embodiment of the present disclosure, when the target object is the second application, the second object may be an application icon of the second application, or may be any object that may be used to indicate the second application such as any area on an application interface of the second application. When the target object is the target function, the second object may be a function object used to indicate a function of the terminal device, or may be any other object that may be used to indicate the target function. Specifically, this may be determined based on an actual use requirement, and is not limited in this embodiment of the present disclosure.

Figure 4:
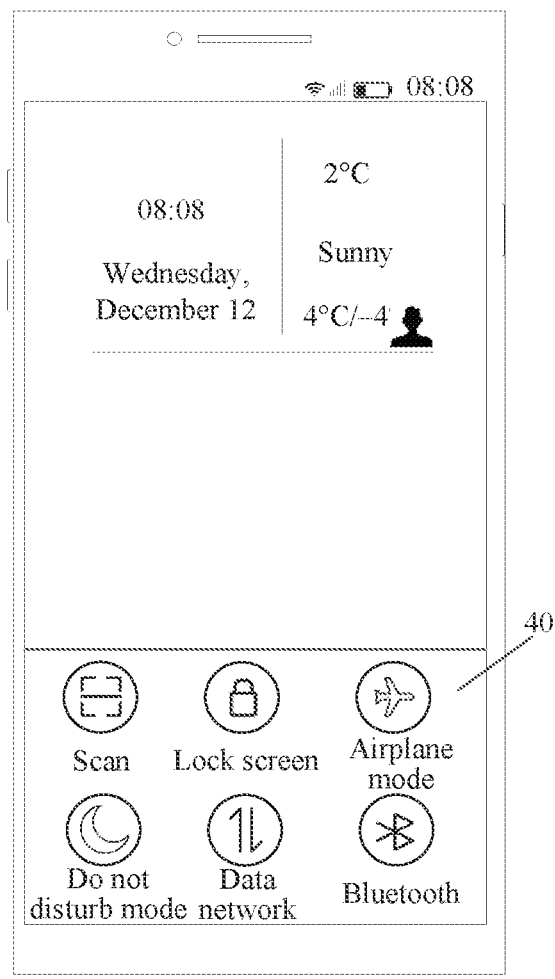
FIG. 4 is a schematic diagram of displaying a second object by a terminal device according to an embodiment of the present disclosure.

Optionally, in this embodiment of the present disclosure, the target function may be any function of a system of the terminal device, such as a positioning function of the terminal device, a Bluetooth function of the terminal device, and a network function of the terminal device. The target function may be indicated by a function icon. The function icon may be a function icon in a shortcut operation panel (or referred to as a task bar) of the terminal device (for example, each function icon in an area shown in 40 in FIG. 4).

Optionally, in this embodiment of the present disclosure, the first application may be a downloadable application in the terminal device. The downloadable application may be an application pre-installed in the terminal device, or may be a third-party application downloaded by the user and installed in the terminal device, for example, a communication type application, a shopping type application, and a video type application in the terminal device.

Optionally, in this embodiment of the present disclosure, the second application may be an embedded application (that is, a system application of the terminal device). The embedded application is an application provided for implementing some functions of the terminal device, for example, a camera application, a contact application, and an SMS application in the terminal device.

Optionally, in this embodiment of the present disclosure, the first application and the second application may be different applications.

For example, in this embodiment of the present disclosure, the first application is a communication type application, and the second application is a camera application. If the user needs to configure, for the communication type application a permission to access the camera application, the user may trigger, through the first input, the terminal device to perform the permission configuration method provided in this embodiment of the present disclosure, so that the permission to access the camera application can be configured for the communication type application.

Optionally, in this embodiment of the present disclosure, the first input may include a first sub-input and a second sub-input. The first sub-input is an input on the first object, and the second sub-input is an input on the second object. The first sub-input and the second sub-input may be two consecutive inputs, or may be two inputs that are simultaneously triggered. Specifically, this may be determined based on an actual use requirement, and is not limited in the embodiments of the present disclosure.

It should be noted that in this embodiment of the present disclosure, in the first case, that the first sub-input and the second sub-input are two consecutive inputs means that the user immediately performs the second sub-input after performing the first sub-input, that is, the user performs no other operation between the two sub-inputs, and a time interval between the two sub-inputs performed by the user is within a preset time range. For example, the user may immediately perform an input on the second object by using a finger after performing an Input on the first object by using the finger.

It may be understood that in the first case, generally, the terminal device first receives the first sub-input, and then receives the second sub-input. Because the two sub-inputs are two consecutive inputs, the terminal device may use the first sub-input and the second sub-input as one input response.

In the second case, that the first sub-input and the second sub-input are two inputs that are simultaneously triggered means that the user performs the second sub-input while performing the first sub-input, that is, the two sub-inputs are simultaneously performed. For example, the user may perform an input on the second object by using another finger while performing an input on the first object by using one finger.

It may be understood that in the second case, generally, the terminal device simultaneously receives the first sub-input and the second sub-input, Because the two sub-inputs are two inputs that are simultaneously performed, the terminal device may use the first sub-input and the second sub-input as one input response.

Optionally, in this embodiment of the present disclosure, the first sub-input may be an input performed by the user on the first object. For example, the first sub-input may be an input in any possible form such as a click input (which may be a single-click input or a double-click input), a re-press input, and a touch and hold input performed by the user on the first object. This may be specifically determined based on an actual use requirement, and is not limited in this embodiment of the present disclosure.

Optionally, in this embodiment of the present disclosure, the second sub-input may be an input performed by the user on the second object. For example, the second sub-input may be an input in any possible form such as a click input (which may be a single-click input or a double-click input), a re-press input, and a touch and hold input performed by the user on the second object. This may be specifically determined based on an actual use requirement, and is not limited in this embodiment of the present disclosure.

The re-press input is also referred to as a pressure touch input, and is an input performed by the user on the first object (or the second object) by using a pressure value greater than or equal to a pressure threshold. The touch and hold input is an input performed by the user on the first object (or the second object) by using duration greater than or equal to a time threshold.

Optionally, in this embodiment of the present disclosure, the first interface is different from the second interface. In some example, the first interface and the second interface may be interfaces of different areas on one screen of the terminal device, or the first interface and the second interface may be interfaces on different screens of the terminal device.

In some example, when the first interface and the second interface may be interfaces of different areas on one screen of the terminal device, the first interface and the second interface are interfaces displayed on one screen of the terminal device through split-screen viewing. In this case, the terminal device may have one or more screens.

When the first interface and the second interface are interfaces on different screens of the terminal device, the first interface is an interface displayed on one screen of the terminal device, and the second interface is an interface displayed on another screen of the terminal device. In this case, the terminal device has a plurality of screens.

Figure 5A:
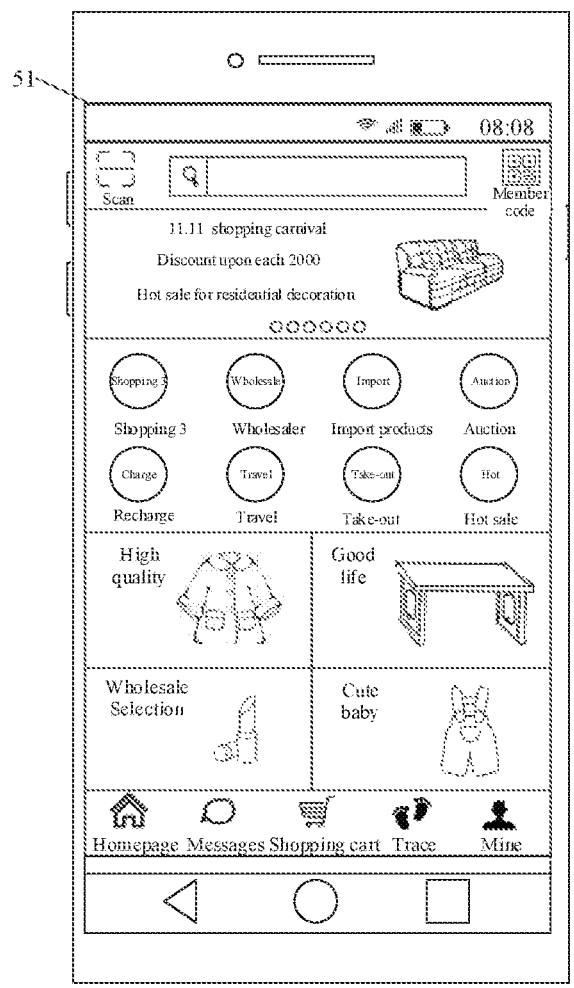
FIG. 5A is a schematic diagram of displaying a first interface by a terminal device according to an embodiment of the present disclosure.
Figure 5B:
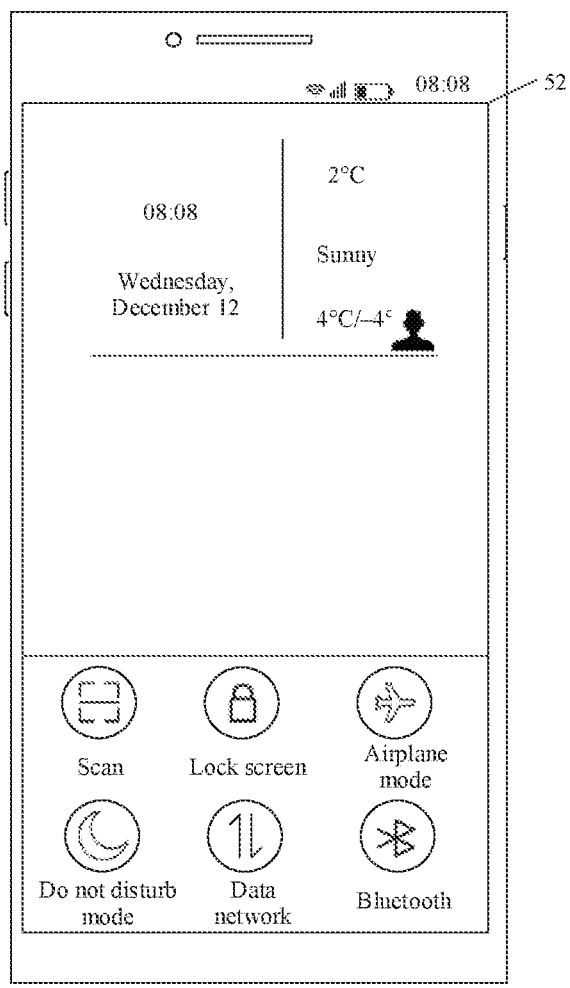
FIG. 5B is a schematic diagram of displaying a second interface by a terminal device according to an embodiment of the present disclosure.

For example, in this embodiment of the present disclosure, the first interface and the second interface are interfaces on different screens of the terminal device. As shown in 51 in FIG. 5A and 52 in FIG. 5B, 51 represents the first interface of the terminal device, and 52 represents the second interface of the terminal device. In FIG. 5A, the first interface represented by 51 is an interface of the first application. In this case, the first object used to indicate the first application may be the first interface, and may be specifically any location on the first interface. The second interface represented by 52 is an interface that includes a plurality of function objects. In this case, the second object is used to indicate the target function, and the second object is one of the plurality of function objects. It may be understood that FIG. SA and FIG. 5B in this embodiment of the present disclosure is merely an example enumeration. In actual implementation, this may be determined based on an actual use requirement, and is not limited in this embodiment of the present disclosure.

S202. The terminal device displays a target permission set on a first interface in response to the first input.

The target permission set is an intersection set between a first permission set and a second permission set. The first permission set is a permission set of the first application, and the second permission set is a permission set of the target object (the second application or the target function). The target permission set may be used to configure a permission of the first application.

It should be noted that, in this embodiment of the present disclosure, although each permission entry in the first permission set and the second permission set includes a permission name and a permission state, a result of taking the intersection set between the first permission set and the second permission set in this embodiment of the present disclosure is to configure a permission for the first application (that is, to configure a permission state in a corresponding permission entry). Therefore, in this embodiment of the present disclosure, only a permission name may be considered when the intersection set between the first permission set and the second permission set is taken, without considering a permission state. That is, the result of taking the intersection set between the first permission set and the second permission set is to obtain permission entries whose permission names are the same in the first permission set and the second permission set. In other words, permission entries in the target permission set are the permission entries whose permission names are the same in the first permission set and the second permission set. Permission states of the permission entries whose permission names are the same may be the same as permission states of corresponding permission entries in the first permission set, or may be the same as permission states of corresponding permission entries in the second permission set. That is, these permission entries may be completely the same as corresponding permission entries in the first permission set (that is, both permission names and permission states of the two are the same), or may be completely the same as corresponding permission entries in the second permission set.

For example, it is assumed that the first permission set is represented as {permission entry 1, permission entry 2, and permission entry 3}. The permission entry 1 may be represented as {permission name 1, permission state A}, permission entry 2 may be represented as {permission name 2, permission state A}, and the permission entry 3 may be represented as {permission name 3, permission state B}. The second permission set is represented as {permission entry 4, permission entry 5, and permission entry 6}. The permission entry 4 may be represented as {permission name 1, permission state B}, the permission entry 5 may be represented as {permission name 2, permission state A}, and the permission entry 6 may be represented as {permission name 4, permission state A}. The target permission set obtained by the terminal device by taking the intersection set between the first permission set and the second permission set may include a permission entry corresponding to the permission name 1 and a permission entry corresponding to the permission name 2. For example, the target permission set obtained by the terminal device may be a permission set 1, or may be a permission set 2. The permission set 1 may be represented as {permission entry 1, permission entry 2}, and the permission set 2 may be represented as {permission entry 4, permission entry 5}.

It may be understood that permission entries in the target permission set obtained by the terminal device may be completely the same as corresponding permission entries in the first permission set, for example, the target permission set s the permission set 1; or may be completely the same as corresponding permission entries in the second permission set, for example, the target permission set is the permission set 2.

In this embodiment of the present disclosure, to configure a permission for the first application, permission entries in the target permission set obtained by the terminal device are completely the same as corresponding permission entries in the first permission se both permission names and permission states are the same), so that the user can accurately configure a permission required for the first application. For permissions that do not need to be configured for the first application, original states of these permissions in the first application may be default. In this way, unnecessary configuration can be avoided, thereby improving efficiency of configuring a permission for the first application.

Optionally, in this embodiment of the present disclosure, the first permission set may include only a non-inherent permission, or the first permission set may include an inherent permission and a non-inherent permission. The inherent permission is an essential permission of the first application, and the non-inherent permission is not an essential permission of the first application (that is, a permission set by the user that the first application has or does not). It may be understood that the first application in this embodiment of the present disclosure may be an application that has only a non-inherent permission, or the first application may be an application that has both an inherent permission and a non-inherent permission, for example, the first application is a downloadable application in the terminal device.

Configuring a permission for the first application in this embodiment of the disclosure is configuring a non-inherent permission for the first application.

Optionally, in this embodiment of the present disclosure, the second permission set includes only an inherent permission. The inherent permission is an essential permission of the target object. It may be understood that the target object in this embodiment of the present disclosure may be an object that has only an inherent permission.

In this embodiment of the present disclosure, if the foregoing target object varies, the second permission set (that is, the permission set of the target object) also varies. For example, when the target object is the second application, the second permission set is the permission set of the second application. When the target object is the target function, the second permission set is the permission set of the target function. The following separately describes the two cases (for example, the following (1) and (2)) by using an example.

(1). The target object is the second application, and the second permission set is the permission set of the second application.

In the foregoing (1), the target object is the second application, that is, the second object is used to indicate the second application. The second object may be an application icon of the second application (as shown in 30 in FIG. 3), or may be an interface of the second application (which may be any location on the second interface (as shown in 51 in FIG. 5A)).

Optionally, the second application in this embodiment of the present disclosure may be an application that has only an inherent permission, for example, the second application is an embedded application (that is, a system application) in the terminal device. The inherent permission of the second application is an essential permission of the second application.

Optionally, if the second application in this embodiment of the present disclosure varies, the inherent permission of the second application may vary. The following separately describes the inherent permission of the second application by using examples in which the second application is several different applications.

For example, the second application is a telephony application, and inherent permissions of the telephony application may include a "Make a call" permission, an "Access a call record" permission, and a "Write a call record" permission. That is, essential permissions of the telephony application may include the "Make a call" permission, the "Access a call record" permission, and the "Write a call record" permission.

For another example, the second application is a contact application, and inherent permissions of the contact application may include an "Access a contact" permission and a "Write a contact" permission. That is, essential permissions of the contact application may include the "Access a contact" permission and the "Write a contact" permission.

For another example, the second application is an SMS application, and inherent permissions of the SMS application may include a "Send an SMS message" permission and a "Write an SMS message" permission. That is, essential permissions of the SMS application may include the "Send an SMS message" permission and the "Write an SMS message" permission.

For another example, the second application is a camera application, and an inherent permission of the camera application may include a "Use a camera lens" permission. That is, an essential permission of the camera application may include the "Use a camera lens" permission.

For another example, the second application is a calendar application, and inherent permissions of the calendar application may include an "Access a schedule" permission and a "Write a schedule" permission. That is, essential permissions of the calendar application include the "Access a schedule" permission and the "Write a schedule" permission.

For another example, the second application is a setting application, and an inherent permission of the setting application may include a "Modify a system setting" permission. That is, an essential permission of the setting application may include the "Modify a system setting" permission.

For another example, the second application is an application store application, and an inherent permission of the application store application may include a "Read information about an installed application" permission and an "Install an application" permission. That is, essential permissions of the application store application may include the "Read information about an installed application" permission and the "Install an application" permission.

For another example, the second application is a file management application, and an inherent permission of the file management application may include a "Store" permission. That is, an essential permission of the file management application may include the "Store" permission.

It should be noted that the foregoing enumerated several possible second applications are merely example enumerations. In specific implementation, the second application in this solution may be any other application that meets an actual use requirement. This is not limited in this embodiment of the present disclosure.

(2). The target object is the target function, and the second permission set is the permission set of the target function.

In the foregoing (2), the target object is the target function, that is, the second object is used to indicate the target function. The second object may be a function icon of the target function, and may be a function icon (as shown in 40 in FIG. 4) that is in a shortcut operation panel (or referred to as a task bar) and that is used to trigger the target function through a shortcut.

Optionally, the target function in this embodiment of the present disclosure may be a function that has only an inherent permission, for example, the target function is some functions of a system of the terminal device. The inherent permission of the target function is an essential permission of the target function.

Optionally, if the target function in this embodiment of the present disclosure varies, the inherent permission of the target function may vary. The following separately describes the inherent permission of the target function by using examples in which the target function is several different functions.

For example, the target function is a wireless local area network (Wireless Local Area Network, WLAN) function, and an inherent permission of the WLAN function may include a "WLAN Internet access" permission. That is, an essential permission of the WLAN function may include the "WLAN Internet access" permission.

Fax another example, the target function is a data network function, and an inherent permission of the data network function may include a "Data network Internet access" permission. That is, an essential permission of the data network function may include the "Data network Internet access" permission.

For another example, the target function is a positioning function, and an inherent permission of the positioning function may include a "Mobile phone positioning" permission, That is, an essential permission of the positioning function may include the "Mobile phone positioning" permission.

In this embodiment of the present disclosure, after the terminal device receives the first input performed by the user on the first object (used to indicate the first application) and the second object (used to indicate the second application or the target function), the terminal device may display the target permission set on the first interface of the terminal device in response to the first input, so that the user can configure a corresponding permission for the first application by using an input of a permission entry in the target permission set.

Figure 6:
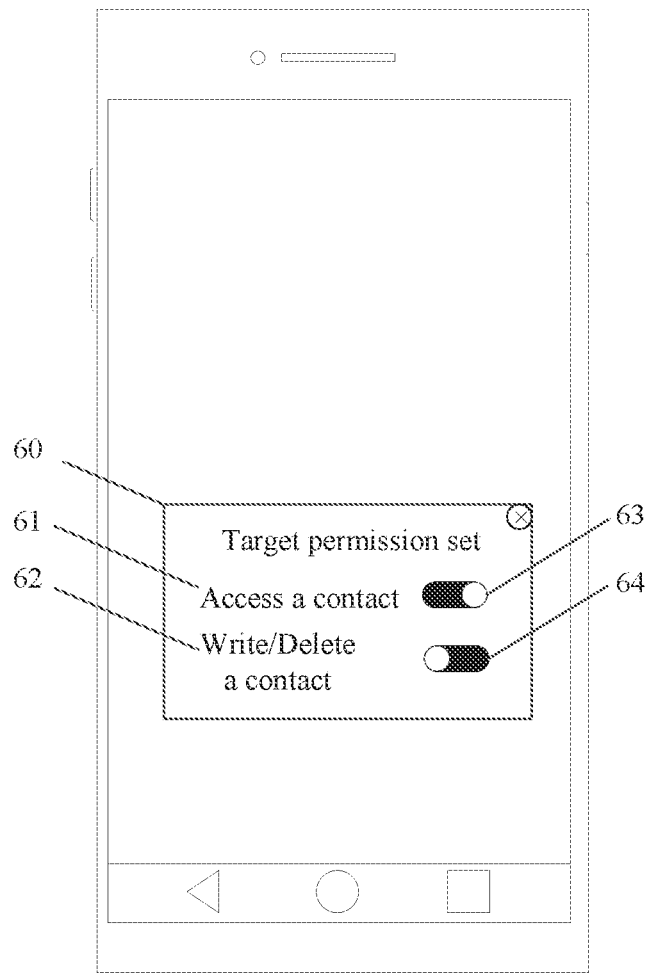
FIG. 6 is a schematic diagram of displaying a target permission set by a terminal device according to an embodiment of the present disclosure.

For example, it is assumed that the first application indicated by the first object is a communication type application, and the second application indicated by the second object is a contact application. That is, the user needs to configure, for the communication type application, a permission to access the contact application. The first object is located on the first interface, the second object is located on the second interface, a permission set of the communication type application includes an "Access a contact" permission entry, an "Add a contact" permission entry, and a "Write/Delete a contact" permission entry, and a permission set of the contact application includes an "Access a contact" permission entry and a "Write/Delete a contact" permission entry. In this case, after the user performs the input (that is, the first input) on the first object and the second object, that is, after the terminal device receives the first input performed by the user, the terminal device may display the target permission set (as shown in 60 in FIG. 6) on the first interface in response to the first input. The target permission set may be an intersection set between a permission set of the communication type application and a permission set of the contact application, that is, the target permission set may include an "Access a contact" permission entry shown in 61 in FIG. 6 and a "Write/Delete a contact" permission entry shown in 62 in FIG. 6.

It may be understood that, in this embodiment of the present disclosure, an intersection set between the permission set of the communication type application and the permission set of the contact application refers to permission entries corresponding to an intersection set of permission names in the permission set of the communication type application and permission names in the permission set of the contact application. Permission states of the permission entries whose permission names are the same may be the same as permission states of corresponding permission entries in the permission set of the communication type application, or may be the same as permission states of corresponding permission entries in the permission set of the contact application. That is, these permission entries may be completely the same as corresponding permission entries in the permission set of the communication type application (that is, both permission names and permission states of the two are the same), or may be completely the same as corresponding permission entries in the permission set of the contact application.

For example, it is assumed that a permission state of the "Access a contact" permission entry in the permission set of the communication type application is an allowed state, and a permission state of the "Access a contact" permission entry in the permission set contact application is a forbidden state. In this case, after the intersection set between the permission set of the communication type application and the permission set of the contact application is taken, a permission state of the "Access a contact" permission entry in the intersection set may be an allowed state, or may be a forbidden state, that is, the "Access a contact" permission entry in the intersection set may be the same as the "Access a contact" permission entry in the permission set of the communication type application, or may be the same as the "Access a contact" permission entry in the permission set of the contact application. Specifically, this may be determined based on an actual use requirement, and is not limited in the embodiments of the present disclosure.

A method for obtaining the first permission set, the second permission set, and the target permission set by the terminal device is described in detail in the following embodiment. Details are not described herein.

In this embodiment of the present disclosure, the terminal device may receive the first input performed by the user on the first object and the second object, and directly display, in response to the first input on the first interface of the terminal device, a permission set (that is, the foregoing target permission set) of a permission configured for the first application indicated by the first object. In this way, when the user needs to configure, for one application, a permission to access another application, the terminal device may trigger, based on an input performed by the user (for example, the foregoing first input), the terminal device to quickly display, on the first interface of the terminal device, a permission entry configured for the first application, without requiring the user to spend a large amount of time searching for a permission enter that needs to be configured on a permission management interface. Therefore, an invalid search of the user on the permission management interface can be avoided, so that duration in which the terminal device configures a permission for an application can be shortened, thereby improving efficiency of configuring the permission for the application by the terminal device.

Optionally, in this embodiment of the present disclosure, after the terminal device receives the first input performed by the user, the terminal device may first obtain the permission set of the first application (that is, the first permission set in this embodiment of the present disclosure) and the permission set of the second application (that is, the second permission set in this embodiment of the present disclosure) in response to the first input, and then obtain the intersection set between the permission set of the first application and the permission set of the second application (that is, the target permission set in this embodiment of the present disclosure).

Figure 7:
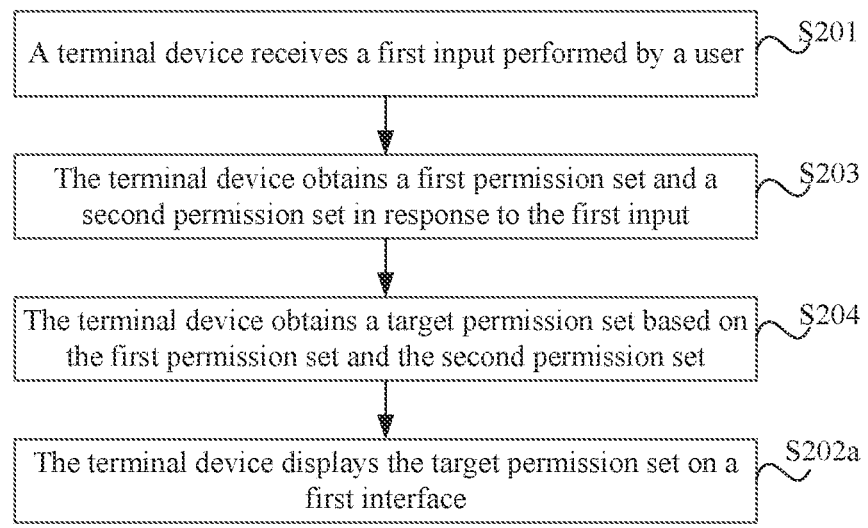
FIG. 7 is a schematic diagram 2 of a permission configuration method according to an embodiment of the present disclosure.

For example, with reference to FIG. 2, as shown in FIG. 7, before the foregoing S202, the permission configuration method provided in this embodiment of the present disclosure may further include the following S203 and S204. Correspondingly, the foregoing S202 may be implemented by the following S202a.

S203. The terminal device obtains a first permission set and a second permission set in response to the first input.

In this embodiment of the present disclosure, the user may trigger, through the first input performed on the first object and the second object, the terminal device to obtain the permission set (that is, the foregoing first permission set) of the first application indicated by the first object and the permission set (that is, the foregoing second permission set) of the target object (that is, the second application or the target function) indicated by the second object.

S204. The terminal device obtains the target permission set based on the first permission set and the second permission set.

In this embodiment of the present disclosure, after the terminal device obtains the first permission set and the second permission set, the terminal device may obtain the target permission set by taking an intersection set between the first permission set and the second permission set.

For descriptions of obtaining, by the terminal device, the target permission set based on the first permission set and the second permission set, refer to the related descriptions and the examples in the foregoing S202. Details are not described herein again.

S202a. The terminal device displays the target permission set on the first interface.

It should be noted that, in this embodiment of the present disclosure, the step of obtaining the first permission set and the second permission set in S203 shown in FIGS. 7, S204, and S202a all are steps performed by the terminal device in response to the first input. To clearly illustrate each step, only S203 in FIG. 7 shows "In response to the first input".

In this embodiment of the present disclosure, the terminal device may first obtain the permission set of the first application (that is, the first permission set) and the permission set of the second application/the target function (that is, the second permission set) in response to the first input performed by the user, and then obtain the intersection se between the first permission set and the second permission set based on a permission entry in the first permission set and a permission entry in the second permission set, that is, a common permission of the first application and the second application, so that the permission to access the second application can be configured for the first application. In this way, when the user needs to configure, for the first application, the permission to access the second application, the terminal device may quickly obtain, in response to the first input performed by the user, a permission set for configuring a related permission for the first application, to quickly configure, for the first application, the permission to access the second application.

Optionally, in this embodiment of the present disclosure, before the terminal device obtains the permission set of the foregoing target object (that is, the second application/the target function), the terminal device first needs to determine whether the target object has an essential permission (that is, the foregoing inherent permission). In a case that the target object has an essential permission, the terminal device may obtain the permission set of the target object, that is, the foregoing second permission set. In a case that the target object does not have an essential permission, the terminal device may not need to obtain the permission set of the target object, and prompts the user that the target object does not have an essential permission.

For example, reference to FIG. 7, before the terminal device obtains the second permission set in the foregoing S203, the permission configuration method provided in this embodiment of the present disclosure may further include the following S205 and S206.

S205. The terminal device determines whether the target object has an inherent permission.

In this embodiment of the present disclosure, after the terminal device receives the first input performed by the user, the terminal device first determines, in response to the first input, whether the target object has an inherent permission. If the terminal device determines that the target object has an inherent permission, the terminal device may continue to perform the step of obtaining the second permission set in S203. If the terminal device determines that the target object does not have an inherent permission, the terminal device may continue to perform the following S206.

It may be understood that in this embodiment of the present disclosure, the terminal device may alternatively perform the step of obtaining the second permission set in S203 and the following S206. After performing S205, the terminal device may perform the step of obtaining the second permission set in S203 or perform the following S206.

Before the terminal device obtains the permission set of the target object, the terminal device may determine whether the target object has an inherent permission. In a case that the terminal device determines that the target object has an inherent permission, the terminal device may continue to perform the step of obtaining the second permission set in S203, that is, the terminal device obtains the second permission set. In this case, all permissions corresponding to the second permission set are inherent permissions of the target object. In a case that the terminal device determines that the target object does not have an inherent permission, the terminal device may continue to perform the following S206, that is, the terminal device displays first prompt information, where the first prompt information is used to indicate that the target object does not have an inherent permission.

It may be understood that, in this embodiment of the present disclosure, when the target object (the second application or the target function) is an object that has only an inherent permission, all permissions corresponding to the second permission set obtained by the terminal device are inherent permissions of the target object.

S206. The terminal device displays first prompt information.

The first prompt information may be used to indicate that the second application does not have an inherent permission.

Figure 9:
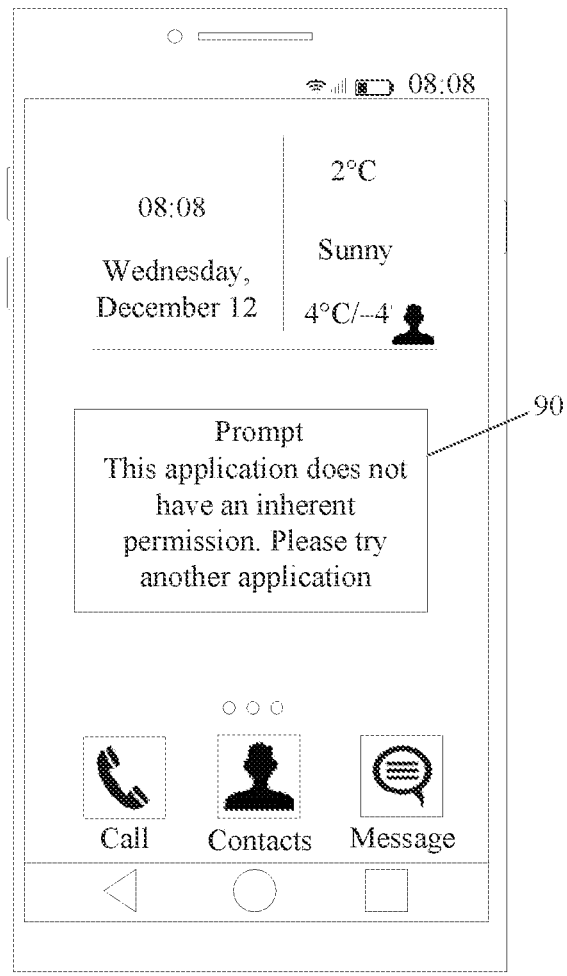
FIG. 9 is a schematic diagram of displaying first prompt information by a terminal device according to an embodiment of the present disclosure.

For example, it is assumed that the first application indicated by the first object is a communication type application, the second object indicates the second application, and the second application is an SMS application. After the terminal device receives the first input performed by the user on the first object and the second object, the terminal device may obtain a permission set of the communication type application (that is, the foregoing first permission set), and obtain a permission set of the SMS application (that is, the foregoing second permission set including an inherent permission of the SMS application) in a case that the SMS application has an inherent permission. Certainly, if the terminal device determines that the SMS application does not have an inherent permission, as shown in 90 in FIG. 9, the terminal device may display the first prompt information "This application does not have an inherent permission. Please try another application", to prompt the user that the SMS application does not have an inherent permission, that is, the terminal device does not need to obtain the permission set of the SMS application. Therefore, the terminal device also does not need to obtain an intersection set between the permission set of the communication type application and the permission set of the SMS application, and the user cannot configure, for the communication type application, a permission to access the SMS application.

In this embodiment of the present disclosure, when the user needs to configure, for the first application, the permission to access the second application, if the second application does not have an inherent permission, and the terminal device displays the first prompt information to prompt the user that the second application does not have an inherent permission, the user may determine that the terminal device cannot configure for the first application, the permission to access the second application. That is, the user may determine that the first application cannot access the second application.

It should be noted that in this embodiment of the present disclosure, both the foregoing S205 and the foregoing S206 are steps performed by the terminal device in response to the first input.

Optionally, in this embodiment of the present disclosure, before the terminal device obtains the target permission set based on the first permission set and the second permission set, the terminal device first needs to determine whether the first permission set and the second permission set include a same permission name. In a case that the first permission set and the second permission set include a same permission name, the terminal device may obtain the target permission set based on the first permission set and the second permission set, and display the target permission set on the first interface of the terminal device. In a case that the first permission set and the second permission set do not include a same permission name, the terminal device may prompt the user that the first application cannot have a permission corresponding to the second permission set (that is, the first application cannot use a function of the permission corresponding to the second permission set).

Figure 8:
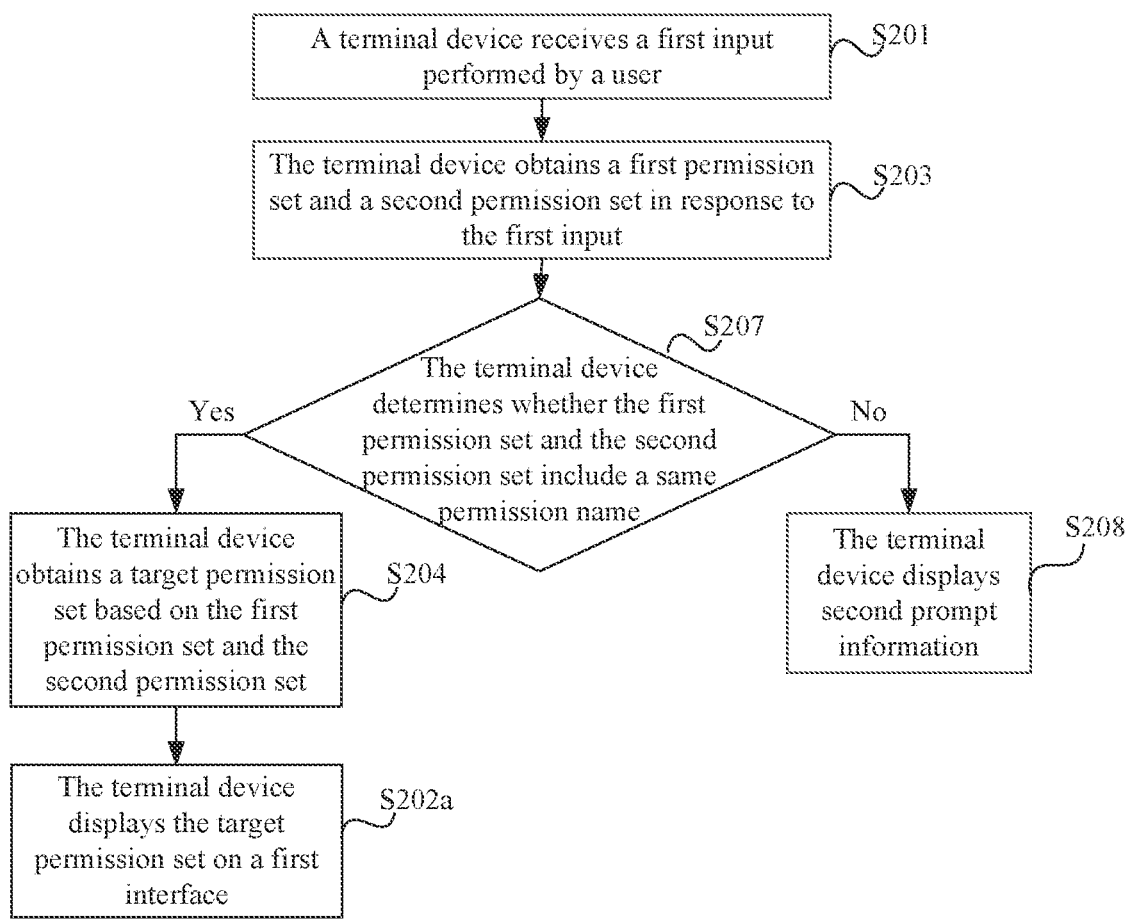
FIG. 8 is a schematic diagram 3 of a permission configuration method according to an embodiment of the present disclosure.

For example, with reference to FIG. 7, as shown in FIG. 8, after the foregoing S203 and before the foregoing S204, the permission configuration method provided in this embodiment of the present disclosure may further include the following S207 and S208.

S207. The terminal device determines whether the first permission set and the second permission set include a same permission name.

In this embodiment of the present disclosure, if the terminal device determines that the first permission set and the second permission set include a same permission name, the terminal device may continue to perform the foregoing S204. If the terminal device determines that the first permission set and the second permission set do not include a same permission name, the terminal device may continue to perform the following S208.

It may be understood that in this embodiment of the present disclosure, the terminal device may alternatively perform the foregoing S204 and the following S208. Specifically, after performing the foregoing S207, the terminal device may perform the foregoing S204 or perform the following S208.

In this embodiment of the present disclosure, after the terminal device obtains the first permission set and the second permission set, the terminal device may determine whether the first permission set and the second permission set include a same permission name, that is, determine whether the first permission set and the second permission set include a same permission entry (the same permission entry in this solution is permission entries whose permission names are the same, and a permission state may not be considered), In a case that the terminal device determines that the first permission set and the second permission set include a same permission name, the terminal device may perform the foregoing S204. To be specific, the terminal device obtains the target permission set based on the first permission set and the second permission set. In a case that the terminal device determines that the first permission set and the second permission set do not include a same permission name, the terminal device may perform the following S208. To be specific, the terminal device displays second prompt information to indicate the user that the first application cannot have a permission corresponding to the second permission set, that is, the first application cannot use a function of the permission corresponding to the second permission set.

S208. The terminal device displays second prompt information.

The second prompt information may be used to indicate that the first application cannot have a permission corresponding to the second permission set.

Optionally, in this embodiment of the present disclosure, in a case that at least one of permission entries in the first permission set and the second permission set have a same permission name, the terminal device may obtain the intersection set between the first permission set and the second permission set, to obtain the target permission set. In a case that a permission name of a permission entry in the first permission set is different from a permission name of a permission entry in the second permission set, the terminal device may display the second prompt information, to prompt the user that the first application cannot have a permission corresponding to the second permission set.

For example, it is assumed that the second application is a camera application, and the permission set of the second application, that is, the second permission set, is represented as {use a camera lens, allow}. If the terminal device determines that there is no intersection set between the permission set of the first application and the permission set of the second application, that is, the first permission set and the second permission set do not have a same permission name, the terminal device may prompt the user that the first application cannot have a "Use a camera" permission or the first application cannot have the "Use a camera lens" permission, that is, the first application cannot use a camera function or a camera lens function.

It should be noted that, in this embodiment of the present disclosure, the step of obtaining the first permission set and the second permission set in S203 shown in FIGS. 8, S204, S207, S208, and S202*a* all are steps performed by the terminal device in response to the first input. To clearly illustrate each step, only S203 in FIG. 8 shows "In response to the first input".

In this embodiment of the present disclosure, when the user needs to configure, for the first application, the permission to access the second application, if the terminal device determines that the first permission set does not have a permission entry that has a same permission name as that in the second permission set, the terminal device may prompt, by displaying the second prompt information, the user that the first application cannot use a permission corresponding to the permission set of the second application. In this case, the user may know that the first application cannot use a permission in the second permission set.

Optionally, in this embodiment of the present disclosure, the target permission set may include a plurality of permission entries, and each permission entry may be used to indicate one permission. Each permission entry may include a permission name and a permission state, the permission name may be used to indicate a permission, and the permission state may be used to indicate a state of the permission. After the terminal device displays the target permission set on the first interface (including the first object indicating the first application), the user may trigger, by performing an input on a permission entry in the target permission set, the terminal device configures, for the first application, a state of a permission indicated by the permission entry, for example, may configure the first application to allow or forbid to have the permission.

For example, after the foregoing S202, the permission configuration method provided in this embodiment of the present disclosure may further include the following S210 and S211.

S210. The terminal device receives a second input performed by the user on a target permission entry.

The target permission set may include M permission entries, and each permission entry in the M permission entries may be used to indicate one permission. The target permission entry may be a permission entry in the M permission entries, and M is a positive integer.

Optionally, in this embodiment of the present disclosure, each permission entry in the M permission entries may include a permission name and a permission state.

For example, assuming that the target permission set (as shown in 60 in FIG. 6) includes two permission entries: a first permission entry and a second permission entry, the first permission entry may be represented as {access a contact, allow}, and the second permission entry may be represented as {write/delete a contact, forbid}.

For detailed descriptions of a permission entry, refer to the related descriptions of the permission entry in the foregoing embodiment. Details are not described herein again.

Optionally, in this embodiment of the present disclosure, the second input may be an input performed by the user on the target permission entry. The second input may be an input in any possible form such as a click input (which may be a single-click input or a double-click input), a re-press input, and a touch and hold input performed by the user on the target permission entry. This may be determined based on an actual use requirement, and is not limited in this embodiment of the present disclosure.

The re-press input is also referred to as a pressure touch input, and is an input performed by the user on the target permission entry by using a pressure value greater than or equal to a pressure threshold.

S211. The terminal device sets, in response to the second input, a state of a permission indicated by the target permission entry.

The state of the permission indicated by the target permission entry may include an allowed state or a forbidden state. In this embodiment of the present disclosure, a state of a permission indicated by each permission entry may be set by using a setting control (as shown in 63 and 64 in FIG. 6).

Optionally, in this embodiment of the present disclosure, the user may trigger, by performing an input on the setting control (as shown in 63 and 64 in FIG. 6), the terminal device to set a state of a permission indicated by a permission entry. As shown in 63 in FIG. 6, a state of a permission indicated by an "Access a contact" permission entry may be set to an allowed state by performing an input on a setting control corresponding to the "Access a contact" permission entry. Alternatively, as shown in 64 in FIG. 6, a state of a permission indicated by a "Write/delete a contact" permission entry may be set to a forbidden state by performing an input on a setting control corresponding to the "Write/delete a contact" permission entry.

In this embodiment of the present disclosure, after the user triggers, through one input (for example, the foregoing first input), the terminal device to display a permission set configured for the first application (for example, the foregoing target permission set including a plurality of permission entries), the user may trigger, through another input (for example, the foregoing second input), the terminal device to configure a corresponding permission for the first application. In this way, the user may trigger, through one input, the terminal device to quickly display a permission set of permissions configured for the first application, and then configure a permission for the first application through another input, without requiring, as in the prior art, the user to first spend a large amount of time searching for the permission set of the permissions configured for the first application on the permission management interface and then perform an input to trigger the terminal device to configure a permission for the first application. Therefore, an invalid search of the user on the permission management interface can be avoided, and duration in which the terminal device configures a permission for an application can be shortened.

It should be noted that, in the embodiments of the present disclosure, the permission configuration methods shown in the foregoing accompanying drawings are described by using an example with reference to one of the accompanying drawings in the embodiments of the present disclosure. In specific implementation, the permission configuration methods shown in the foregoing accompanying drawings may be further implemented with reference to any other accompanying drawings that may be combined shown in the foregoing embodiments. Details are not described herein again.

Figure 10:
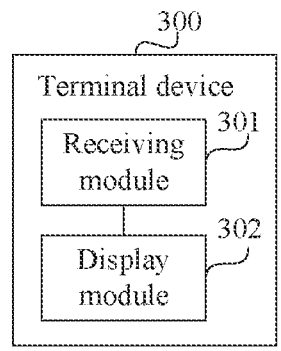
FIG. 10 is a schematic structural diagram 1 of a terminal device according to an embodiment of the present disclosure.

As shown in FIG. 10, an embodiment of the present disclosure provides a terminal device 300. The terminal device 300 may include a receiving module 301 and a display module 302. The receiving module 301 is configured to receive a first input performed by a user, where the first input is an input performed on a first object and a second object, the first object is used to indicate a first application, the second object is used to indicate a target object, the target object is a second application or a target function, the first object is an object on a first interface, and the second object is an object on a second interface. The display module 302 is configured to display a target permission set on the first interface in response to the first input received by the receiving module 301, where the target permission set is an intersection set of a first permission set and a second permission set, the first permission set is a permission set of the first application, the second permission set is a permission set of the target object, and the target permission set is used to configure a permission of the first application; and the first interface is different from the second interface.

Figure 11:
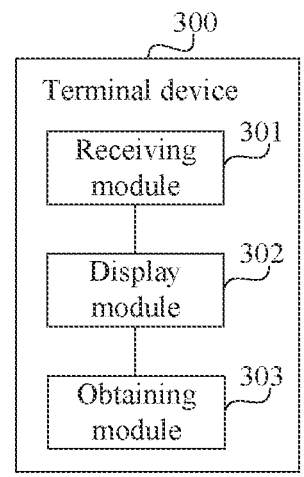
FIG. 11 is a schematic structural diagram 2 of a terminal device according to an embodiment of the present disclosure.

Optionally, in the terminal device provided in this embodiment of the present disclosure, with reference to FIG. 10, as shown in FIG. 11, the terminal device 300 provided in this embodiment of the present disclosure may further include an obtaining module 303. The obtaining module 303 is configured to: before the display module 302 displays the target permission set on the first interface, obtain the first permission set and the second permission set; and obtain the target permission set based on the first permission set and the second permission set.

Optionally, in the terminal device provided in this embodiment of the present disclosure, the obtaining module 303 is configured to obtain the second permission set in a case that the target object has an inherent permission, where all permissions corresponding to the second permission set are inherent permissions of the target object.

Optionally, in the terminal device provided in this embodiment of the present disclosure, the display module 302 is further configured to display first prompt information in a case that the target object does not have an inherent permission, where the first prompt information is used to indicate that the target object does not have an inherent permission.

Optionally, in the terminal device provided in this embodiment of the present disclosure, the obtaining module 303 is configured to obtain the target permission set based on the first permission set and the second permission set in a case that the first permission set and the second permission set include a same permission name.

Optionally, in the terminal device provided in this embodiment of the present disclosure, the display module 302 is further configured to display second prompt information in a case that the first permission set and the second permission set do not include a same permission name, where the second prompt information is used to indicate that the first application cannot have a permission corresponding to the second permission set.

Figure 12:
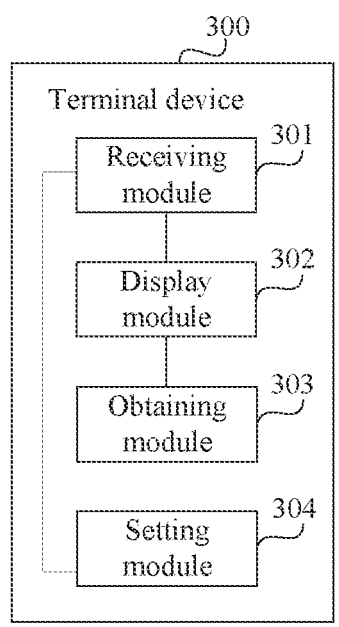
FIG. 12 is a schematic structural diagram 3 of a terminal device according to an embodiment of the present disclosure.

Optionally, in the terminal device provided in this embodiment of the present disclosure, the target permission set includes M permission entries, each permission entry is used to indicate one permission, and M is a positive integer. With reference to FIG. 11, as shown in FIG. 12, the terminal device 300 provided in this embodiment of the present disclosure may further include a setting module 304. The receiving module 301 is further configured to: after the display module 302 displays the target permission set on the first interface, receive a second input performed by the user on a target permission entry, where the target permission entry is a permission entry in the M permission entries displayed by the display module 302; and the setting module 304 is configured to: in response to the second input received by the receiving module 301, set a state of a permission indicated by the target permission entry, where the state includes an allowed state or a forbidden state.

The terminal device 300 provided in this embodiment of the present disclosure can implement the processes implemented by the terminal device in the foregoing method embodiment. To avoid repetition, details are not described herein again.

This embodiment of the present disclosure provides a terminal device. The terminal device may receive a first input performed by a user (the first input is an input performed on a first object used to indicate a first application and a second object used to indicate a second application), and display a target permission set on a first interface of the terminal device in response to the first input, where the target permission set is used to configure a permission of the first application, and the target permission set is an intersection set of a permission set of the first application and a permission set of the second application. In this solution, when the user needs to configure, for one application (for example, the foregoing first application), a permission to access another application (for example, the foregoing second application), the user may trigger, through an input performed on objects that indicate the two applications, the terminal device to automatically obtain an intersection set (for example, the foregoing target permission set) of permission sets of the two applications, and display the intersection set to the user, so that the user can configure, for the first application through an input on a permission entry in the intersection set, the permission to access the second application. In this way, when the user needs to configure, for one application, a permission to access another application, the user may trigger, through one input, the terminal device to quickly display a permission entry that may be configured for the application, without requiring, as in the prior art, the user to spend a large amount of time searching for a permission entry that needs to be configured on the permission management interface. Therefore, in the permission configuration method provided in the embodiments of the present disclosure, an invalid search of the user on the permission management interface can be avoided, so that duration in which the terminal device configures a permission for an application can be shortened, thereby improving efficiency of configuring the permission for the application by the terminal device.

Figure 13:
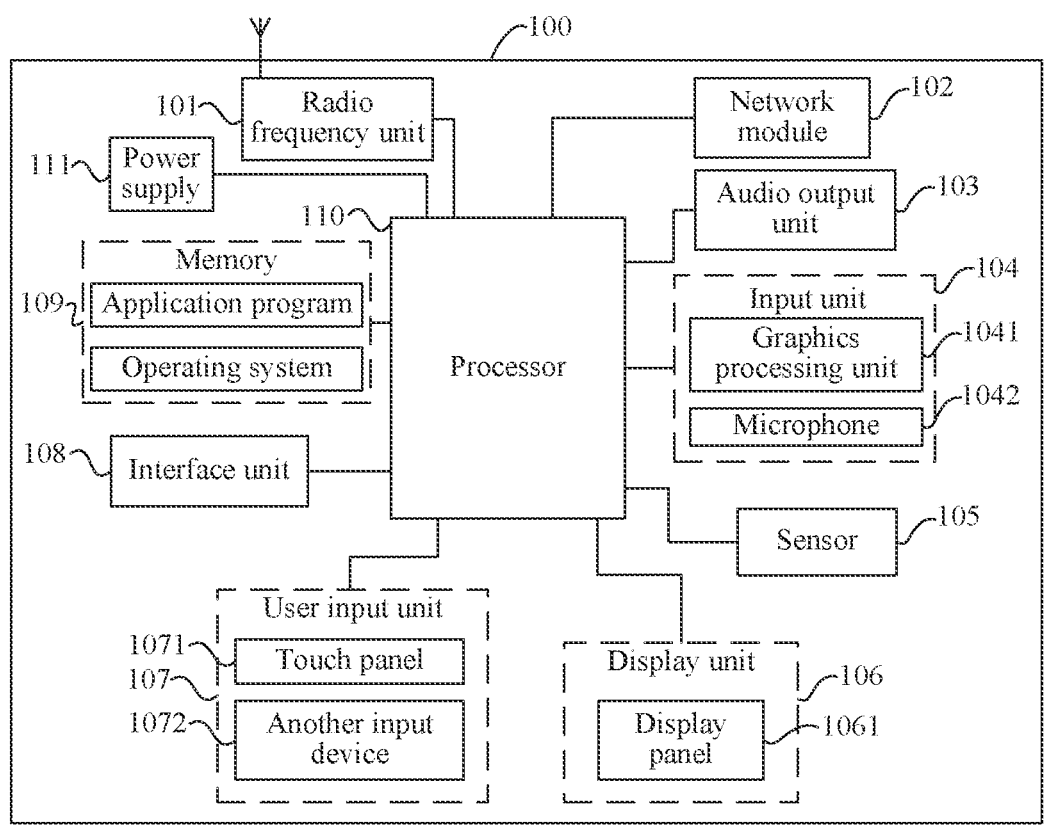
FIG. 13 is a schematic diagram of hardware of a terminal device according to an embodiment of the present disclosure.

FIG. 13 is a schematic diagram of a hardware structure of a terminal device according to embodiments of the present disclosure. The terminal device 100 includes, but is not limited to: a radio frequency unit 101, a network module 102, an audio output unit 103, an input unit 104, a sensor 105, a display unit 106, a user input unit 107, an interface unit 108, a memory 109, a processor 110 and a power supply 111. A person skilled in the art may understand that a structure of the terminal device shown in FIG. 13 does not constitute a limitation on the terminal device, and the terminal device may include more or fewer components than those shown in the figure, or combine some components, or have different component arrangements. In this embodiment of the present disclosure, the terminal device includes but is not limited to a mobile phone, a tablet computer, a notebook computer, a palmtop computer, an in-vehicle terminal, a wearable device, a pedometer, and the like.

The user input unit 107 is configured to receive a first input performed by a user. The processor 110 is configured to display a target permission set on a first interface of the terminal device in response to the first input received by the user input unit 107. The first input is an input performed on a first object and a second object, the first object is used to indicate a first application, the second object is used to indicate a target object, the target object is a second application or a target function, the first object is an object on the first interface, and the second object is an object on a second interface; the target permission set is an intersection set between of a first permission set and a second permission set, the first permission set is a permission set of the first application, the second permission set is a permission set of the target object, and the target permission set is used to configure a permission of the first application; and the first interface is different from the second interface.

This embodiment of the present disclosure provides a terminal device. The terminal device may receive a first input performed by a user (the first input is an input performed on a first object used to indicate a first application and a second object used to indicate a second application), and display a target permission set on a first interface of the terminal device in response to the first input, where the target permission set is used to configure a permission of the first application, and the target permission set is an intersection set of a permission set of the first application and a permission set of the second application. In this solution, when the user needs to configure, for one application (for example, the foregoing first application), a permission to access another application (for example, the foregoing second application), the user may trigger, through an input performed on objects that indicate the two applications, the terminal device to automatically obtain an intersection set (for example, the foregoing target permission set) of permission sets of the two applications, and display the intersection set to the user, so that the user can configure, for the first application through an input on a permission entry in the intersection set, the permission to access the second application. In this way, when the user needs to configure, for one application, a permission to access another application, the user may trigger, through one input, the terminal device to quickly display a permission entry that may be configured for the application, without requiring, as in the prior art, the user to spend a large amount of time searching for a permission entry that needs to be configured on the permission management interface. Therefore, in the permission configuration method provided in the embodiments of the present disclosure, an invalid search of the user on the permission management interface can be avoided, so that duration in which the terminal device configures a permission for an application can be shortened, thereby improving efficiency of configuring the permission for the application by the terminal device.

It should be understood that, in this embodiment of the present disclosure, the radio frequency unit 101 may be configured to receive and send information or a signal in a call process. For example, after receiving downlink data from a base station, the radio frequency unit 101 sends the downlink data to the processor 110 for processing. In addition, the radio frequency unit 101 sends uplink data to the base station. Usually, the radio frequency unit 101 includes but is not limited to an antenna, at least one amplifier, a transceiver, a coupler, a low noise amplifier, a duplexer, or the like. In addition, the radio frequency unit 101 may communicate with a network and another device through a wireless communication system.

The terminal device provides wireless broadband Internet access for the user by using the network module 102, for example, helping the user to send and receive an e-mail, brows a web page, and access streaming media.

The audio output unit 103 can convert audio data received by the radio frequency unit 101 or the network module 102 or stored in the memory 109 into an audio signal, and output the audio signal as sound. In addition, the audio output unit 103 may further provide an audio output (for example, a call signal received voice, or a message received voice) related to a specific function implemented by the terminal device 100. The audio output unit 103 includes a speaker, a buzzer, a telephone receiver, and the like.

The input unit 104 is configured to receive an audio signal or a video signal. The input unit 104 may include a graphics processing unit (GPU) 1041 and a microphone 1042. The graphics processing unit 1041 processes image data of a static picture or a video obtained by an image capture apparatus (for example, a camera lens) in video capture mode or image capture mode. The processed image frame may be displayed on the display unit 106. The image frame processed by the graphics processing unit 1041 may be stored in the memory 109 (or another storage medium) or sent via the radio frequency unit 101 or the network module 102. The microphone 1042 may receive sound and may process such sound into audio data. The processed audio data may be converted, in a call mode, into a format that may be sent to a mobile communication base station by using the radio frequency unit 101 for output.

The terminal device 100 further includes at least one sensor 105, such as an optical sensor, a motion sensor, and other sensors. The light sensor includes an ambient light sensor and a proximity sensor. The ambient light sensor may adjust luminance of the display panel 1061 based on brightness of ambient light. To be proximity sensor may turn off the display panel 1061 and/or backlight when the terminal device 100 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information inputted by a user or information provided to a user. The display unit 106 may include a display panel 1061. The display panel 1061 may be configured in a form of a liquid crystal display (LCD), an organic light-emitting diode (OLED), or the like.

The user input unit 107 may be configured to receive input digit or character information, and generate a key signal input related to a user setting and function control of the terminal device. The user input unit 107 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 110, and receives and executes a command sent by the processor 110. In addition, the touch panel 1071 may be of a resistive type, a capacitive type, an infrared type, a surface acoustic wave type, or the like. The user input unit 107 may include another input device 1072 in addition to the touch panel 1071. The another input device 1072 may include but is not limited to a physical keyboard, a functional button (such as a volume control button or a power on/off button), a trackball, a mouse, and a joystick. Details are not described herein.

The touch panel 1071 can cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. In FIG. 13, the touch panel 1071 and the display panel 1061 are used as two independent components to implement input and output functions of the terminal device. However, in some embodiments, the touch panel 1071 and the display panel 1061 may be integrated to implement the input and output functions of the terminal device. This is not specifically limited herein.

The interface unit 108 is an interface for connecting an external apparatus to the terminal device 100. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 108 may be configured to receive input (for example, data information and power) from an external apparatus and transmit the received input to one or more elements in the terminal device 100 or may be configured to transmit data between the terminal device 100 and an external apparatus.

The memory 109 may be configured to store a software program and various data. The memory 109 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 109 may include a high-speed random access memory, or may include a non-volatile memory, for example, at least one disk storage device, a flash memory, or another on-volatile solid-state storage device.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 may include one or more processing units. Optionally, an application processor and a modem processor may be integrated into the processor 110. The application processor mainly processes an operating system, a user interface, an application program, and the like. The modem processor mainly processes wireless communications. It may be understood that, alternatively, the modem processor may not be integrated into the processor 110.

The terminal device 100 may further include the power supply 111 (such as a battery) that supplies power to each component. Optionally, the power supply 111 may be logically connected to the processor 110 by using a power management system, to implement functions such as charging, discharging, and power consumption management by using the power management system.

In addition, the terminal device 100 includes some functional modules that are not shown. Details are not described herein.

Optionally, an embodiment of the present disclosure further provides a terminal device, including the processor 110 and the memory 109 shown in FIG. 13, and a computer program that is stored in the memory 109 and executable on the processor 110. When the computer program is executed by the processor 110, the processes of the foregoing method embodiments are implemented and a same technical effect can be achieved. To avoid repetition, details are not described herein again.

An embodiment of the present disclosure further provides a non-transitory computer-readable storage medium. The non-transitory computer-readable storage medium stores a computer program, and when the computer program is executed by a processor, the processes of the foregoing method embodiments are implemented and a same technical effect can be achieved. To avoid repetition, details are not described herein again. The non-transitory computer-readable storage medium may include a read-only memory (ROM), a random access memory (RAM), a magnetic disk, an optical disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or device that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present disclosure.

The embodiments of the present invention are described with reference to the accompanying drawings. However, the present invention is not limited to the foregoing specific implementations. The foregoing specific implementations are merely examples, but are not limiting. A person of ordinary skill in the art may make many forms without departing from the objective and the scope of the claims of the present invention, and these forms all fall within the protection scope of the present invention.

What is claimed is:

1. A permission configuration method, performed by a terminal device, wherein the method comprises:
   receiving a first input performed by a user, wherein the first input is an input performed on a first object and a second object, wherein the first object is an application icon of a first application, or the first object is any area that is used to indicate the first application on an application interface of the first application, the second object is an icon of a target object, or the second object is any area that is used to indicate the target object on an interface of the target object, the target object is a second application or a target function, the first object is an object on a first interface, and the second object is an object on a second interface; and
   displaying a target permission set on the first interface in response to the first input, wherein the target permission set is an intersection set between a first permission set and a second permission set, the first permission set is a permission set of the first application, the second permission set is a permission set of the target object, and the target permission set is used to configure a permission of the first application; and
   the first interface is different from the second interface; wherein
   before displaying a target permission set on the first interface, the method further comprises:
   obtaining the first permission set and the second permission set; and
   obtaining the target permission set based on the first permission set and the second permission set;
   wherein the obtaining the second permission set comprises:
   obtaining the second permission set in a case that the target object has an inherent permission, wherein all permissions corresponding to the second permission set are inherent permissions of the target object.

2. The method according to claim 1, wherein the method further comprises:
   displaying first prompt information in a case that the target object does not have an inherent permission, wherein the first prompt information is used to indicate that the target object does not have an inherent permission.

3. The method according to claim 1, wherein the obtaining the target permission set based on the first permission set and the second permission set comprises:
   obtaining the target permission set based on the first permission set and the second permission set in a case that the first permission set and the second permission set comprise a same permission name.

4. The method according to claim 3, wherein the method further comprises:
   displaying second prompt information in a case that the first permission set and the second permission set do not comprise a same permission name, wherein the second prompt information is used to indicate that the first application cannot have a permission corresponding to the second permission set.

5. The method according to claim 1, wherein the target permission set comprises M permission entries, each permission entry is used to indicate one permission, and M is a positive integer; and
   after the displaying a target permission set on the first interface, the method further comprises:
   receiving a second input performed by the user on a target permission entry, wherein the target permission entry is a permission entry in the M permission entries; and
   in response to the second input, setting a state of a permission indicated by the target permission entry, wherein the state comprises an allowed state or a forbidden state.

6. A terminal device, comprising a processor, a memory, and a computer program that is stored in the memory and executable on the processor, wherein the computer program, when executed by the processor, causes the terminal device to perform:
   receiving a first input performed by a user, wherein the first input is an input performed on a first object and a second object, wherein the first object is an application icon of a first application, or the first object is any area that is used to indicate the first application on an application interface of the first application, the second object is an icon of a target object, or the second object is any area that is used to indicate the target object on an interface of the target object, the target object is a second application or a target function, the first object is an object on a first interface, and the second object is an object on a second interface; and
   displaying a target permission set on the first interface in response to the first input, wherein the target permission set is an intersection set between a first permission set and a second permission set, the first permission set is a permission set of the first application, the second permission set is a permission set of the target object, and the target permission set is used to configure a permission of the first application; and the first interface is different from the second interface; wherein the computer program, when executed by the processor, causes the terminal device to further perform:
obtaining the first permission set and the second permission set; and
obtaining the target permission set based on the first permission set and the second permission set; wherein
the computer program, when executed by the processor, causes the terminal device to perform:
obtaining the second permission set in a case that the target object has an inherent permission, wherein all permissions corresponding to the second permission set are inherent permissions of the target object.

7. The terminal device according to claim 6, wherein the computer program, when executed by the processor, causes the terminal device to further perform:
displaying first prompt information in a case that the target object does not have an inherent permission, wherein the first prompt information is used to indicate that the target object does not have an inherent permission.

8. The terminal device according to claim 6, wherein the computer program, when executed by the processor, causes the terminal device to perform:
obtaining the target permission set based on the first permission set and the second permission set in a case that the first permission set and the second permission set comprise a same permission name.

9. The terminal device according to claim 8, wherein the computer program, when executed by the processor, causes the terminal device to further perform:
displaying second prompt information in a case that the first permission set and the second permission set do not comprise a same permission name, wherein the second prompt information is used to indicate that the first application cannot have a permission corresponding to the second permission set.

10. The terminal device according to claim 6, wherein the target permission set comprises M permission entries, each permission entry is used to indicate one permission, and M is a positive integer; and
the computer program, when executed by the processor, causes the terminal device to further perform:
receiving a second input performed by the user on a target permission entry, wherein the target permission entry is a permission entry in the M permission entries; and
in response to the second input, setting a state of a permission indicated by the target permission entry, wherein the state comprises an allowed state or a forbidden state.

11. A non-transitory computer-readable storage medium, wherein the non-transitory computer-readable storage medium stores a computer program, and the computer program, when executed by a processor, causes the processor to perform:
receiving a first input performed by a user, wherein the first input is an input performed on a first object and a second object, wherein the first object is an application icon of a first application, or the first object is any area that is used to indicate the first application on an application interface of the first application, the second object is an icon of a target object, or the second object is any area that is used to indicate the target object on an interface of the target object, the target object is a second application or a target function, the first object is an object on a first interface, and the second object is an object on a second interface; and
displaying a target permission set on the first interface in response to the first input, wherein the target permission set is an intersection set between a first permission set and a second permission set, the first permission set is a permission set of the first application, the second permission set is a permission set of the target object, and the target permission set is used to configure a permission of the first application; and
the first interface is different from the second interface; wherein
the computer program, when executed by the processor, causes the processor to further perform:
obtaining the first permission set and the second permission set; and
obtaining the target permission set based on the first permission set and the second permission set; wherein
the computer program, when executed by the processor, causes the processor to perform:
obtaining the second permission set in a case that the target object has an inherent permission, wherein all permissions corresponding to the second permission set are inherent permissions of the target object.

12. The non-transitory computer-readable storage medium according to claim 11, wherein the computer program, when executed by the processor, causes the processor to perform:
obtaining the target permission set based on the first permission set and the second permission set in a case that the first permission set and the second permission set comprise a same permission name.

13. The non-transitory computer-readable storage medium according to claim 12, wherein the computer program, when executed by the processor, causes the processor to further perform:
displaying second prompt information in a case that the first permission set and the second permission set do not comprise a same permission name, wherein the second prompt information is used to indicate that the first application cannot have a permission corresponding to the second permission set.

14. The non-transitory computer-readable storage medium according to claim 11, wherein the target permission set comprises M permission entries, each permission entry is used to indicate one permission, and M is a positive integer; and
the computer program, when executed by the processor, causes the processor to further perform:
receiving a second input performed by the user on a target permission entry, wherein the target permission entry is a permission entry in the M permission entries; and
in response to the second input, setting a state of a permission indicated by the target permission entry, wherein the state comprises an allowed state or a forbidden state.

15. The non-transitory computer-readable storage medium according to claim 11, wherein the computer program, when executed by the processor, causes the processor to further perform:
displaying first prompt information in a case that the target object does not have an inherent permission, wherein the first prompt information is used to indicate that the target object does not have an inherent permission.

* * * * *